(No Model.) 3 Sheets—Sheet 1.

G. T. McLAUTHLIN.
BARK MILL.

No. 432,550. Patented July 22, 1890.

WITNESSES.
Matthew M. Blunt
Frank W. Alden

INVENTOR.
George T. McLauthlin
by Frank G. Parker Atty.

(No Model.) 3 Sheets—Sheet 2.

G. T. McLAUTHLIN.
BARK MILL.

No. 432,550. Patented July 22, 1890.

WITNESSES.
Matthew M. Blunt,
Frank W. Alden.

INVENTOR.
George T. McLauthlin
by Frank G. Parker Atty (No Model.) 3 Sheets—Sheet 3.
G. T. McLAUTHLIN.
BARK MILL.
No. 432,550. Patented July 22, 1890.
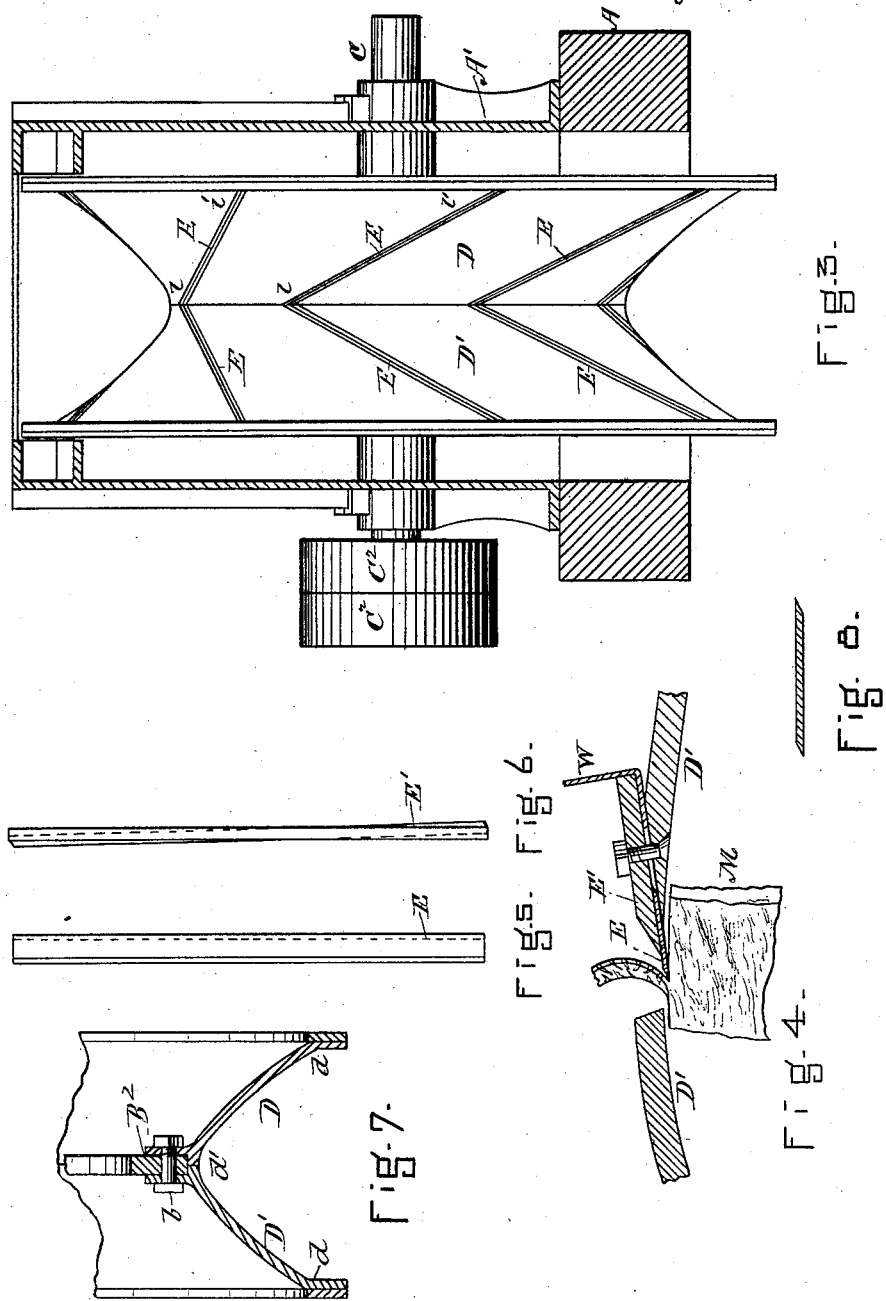
WITNESSES.
Matthew M. Blunt
Frank W. Alden
INVENTOR.
George T. McLauthlin
by Frank G. Parker Atty.

UNITED STATES PATENT OFFICE.

GEORGE T. McLAUTHLIN, OF BOSTON, MASSACHUSETTS.

BARK-MILL.

SPECIFICATION forming part of Letters Patent No. 432,550, dated July 22, 1890.

Application filed November 18, 1889. Serial No. 330,769. (No model.)

*To all whom it may concern:*

Be it known that I, GEORGE T. MCLAUTH-LIN, of Boston, in the county of Suffolk and State of Massachusetts, have invented certain new and useful Improvements in Bark-Mills, of which the following, taken in connection with the accompanying drawings, is a specification.

The object of my invention is to so construct the cutting apparatus of a bark-mill that the bark being operated upon shall be comminuted into thin laminæ, each of which is cracked and broken in such a manner as to leave the product in a most perfect condition for yielding its soluble constituents under the process of steeping and leaching. This object I attain by the mechanism shown in the accompanying drawings, in which—

Figure 1:
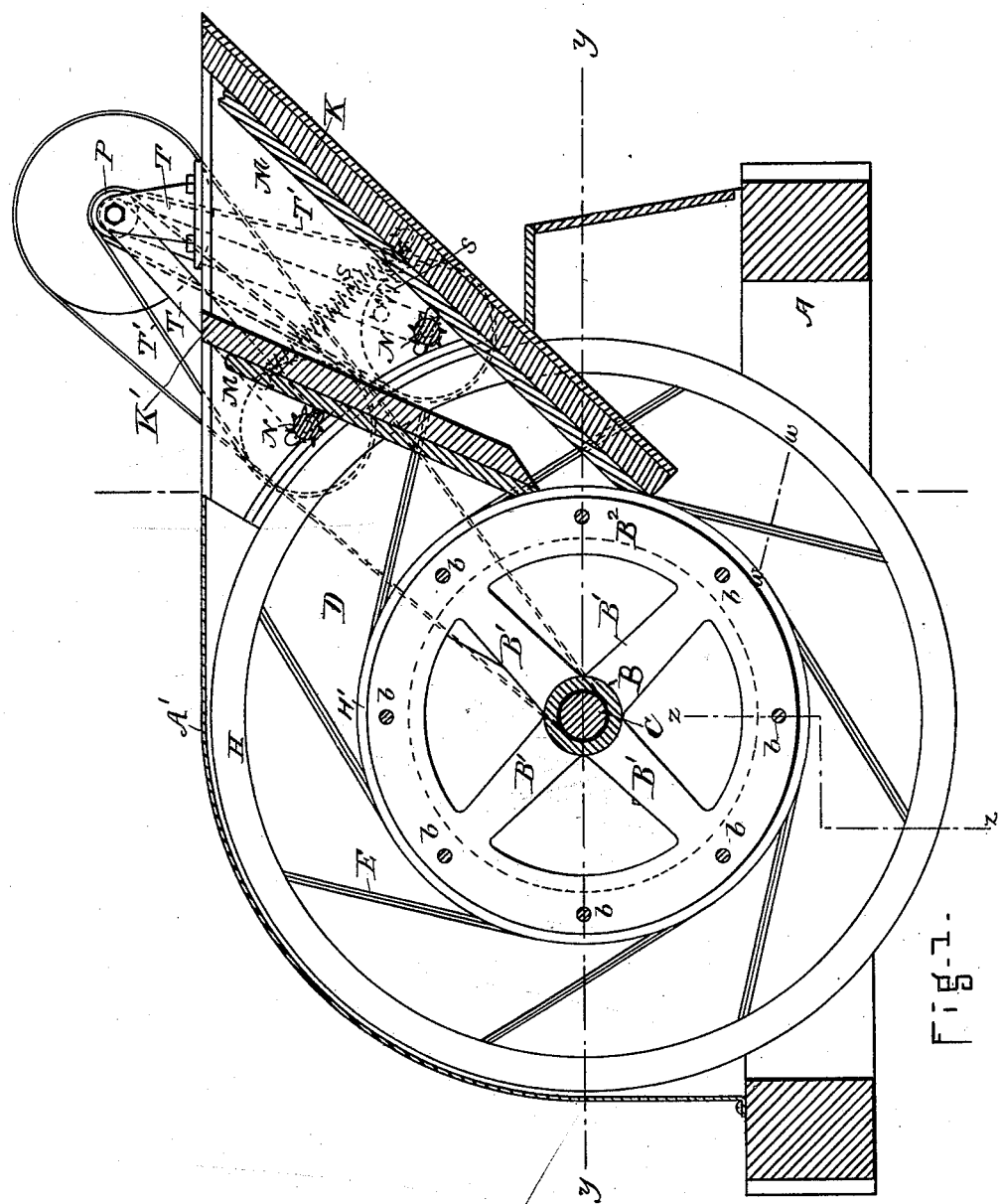
Figure 2:
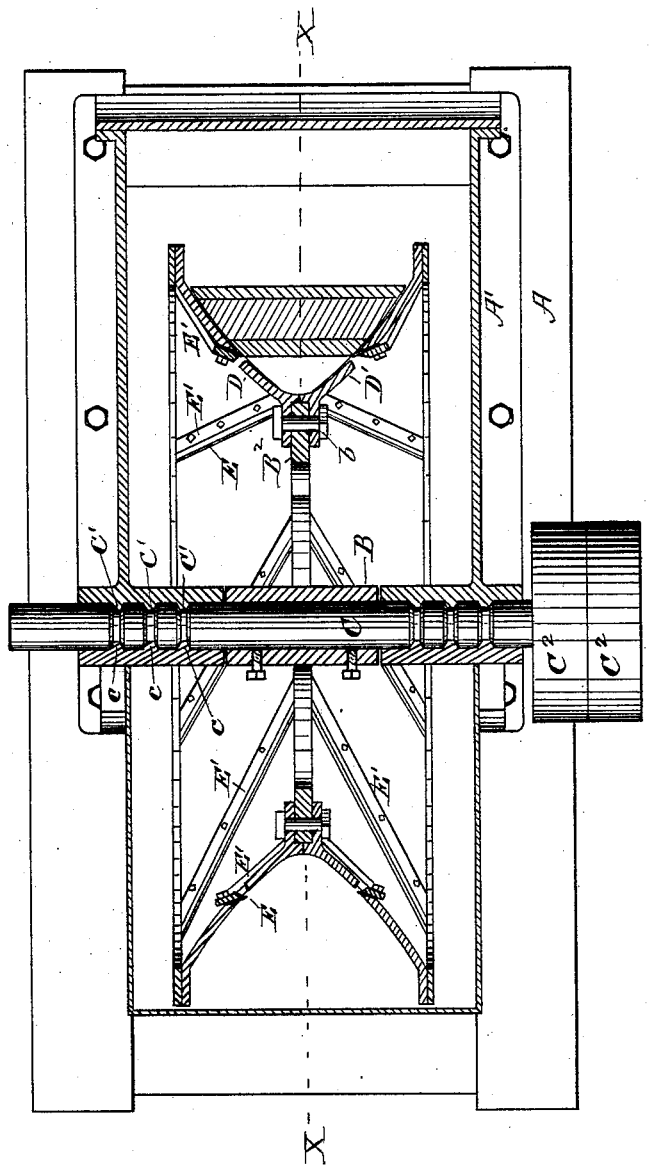

Figure 1 is a longitudinal vertical section taken on line $x\,x$ of Fig. 2. Fig. 2 is a horizontal section taken on line $y\,y$ of Fig. 1. Fig. 3 is a view partly in end elevation and partly in cross vertical section. Fig. 4 is a section of a part showing one of the knives and the connected parts in operation, taken on line $w\,w$, Fig. 1. Fig. 5 is a plan of one of the knives. Fig. 6 is a plan of one of the knife-clamps. Fig. 7 is a section through the knife drum or wheel, taken on line $z\,z$ of Fig. 1. Fig. 8 is a cross-section enlarged of one of the knife-blades.

A represents a strong frame-work, which, if desirable, may be made of wood. To the frame-work A, I attach a metallic casing A'. The parts A and A', above referred to, may be of any suitable style and material. The main shaft C is supported in suitable housings, as shown, and is held from longitudinal movement by grooves C' C', which fit onto corresponding projections $c\,c'$, made in the housings. (See Fig. 2.) The shaft C has upon it fast and loose pulleys $C^2\,C^2$ for receiving the driving-belt.

B represents the hub of the flange-wheel $B^2$, of which B' B' B' B' are the spokes. (See Fig. 1.) To the flange-wheel $B^2$, I attach the knife-holding drum or wheel D D'. The knife-holding drum or wheel is made of two hollow ovate flanges D D', bolted to the flange $B^2$ by bolts $b\,b\,b\,b$. The curve $d\,d'$ of the knife-wheel D D' is of such a nature that a plane parallel to its axis and tangent to a circle of a certain assumed radius will cut the surface on a straight line, as shown at $l\,l$. In other words, the ovate surface of either half of the knife-wheel is a "warped surface" generated by using for a generatrix a straight line, and for directors the circles H and H', the generatrix always being tangent to a given cylinder the axis of which coincides with the axis of the shaft C. It is obvious that straight-edged knives can be used in a surface of this kind and that the cutting-edge of the said straight-edged knives may be made to protrude an even distance throughout their length from the surface of the drum, the same as though the surface were a plane one instead of a curved warped surface. The knives each consist of a thin, flat, and straight strip of steel, (see Fig. 5,) being sharpened on each edge, so that they can be reversed. (See Fig. 8.) The knives are so thin that they may be worked without resharpening either with even or serrated edges. The bed (see Fig. 4) that the knife rests upon is inclined, as indicated, to the surface of the knife-wheel, so that the edge of the knife E will be presented to the bark to be cut at an advantageous angle. The said knife-bed is itself a warped surface, as it must be of necessity, in order to present the same edge angle to the knife-wheel surface. The knife-clamp E', Fig. 6, is made to conform with the knife-bed. When the knife is clamped in its place, it, being thin and flexible, will conform itself to the bed.

By forming the knife-wheel with an ovate working-surface, as above described, I am enabled to get a draw cut and to curve, and thus crack, the thin shaving as it leaves the knife. This cracking of the shaving across its length renders the product extremely well adapted for steeping and leeching, and as the cut is a shear one the work expended in reducing the bark to the proper condition for steeping is much less than that required by the usual method.

My form of knife-wheel and arrangement of the knives admit of the use of straight sheet-metal knives—a form that is very inexpensive and easy to make and to keep sharp. This form of knife-wheel and arrangement of knives and feed table or tables K and K' renders the bark being worked upon nearly, if not quite, self-feeding, the knives having a draw cut.

In case additional feed-power is required I attach to my machine a feed device in connection with the one or more feed-tables K K', which are made to stand at quite an angle above the level, so that the bark will tend to slide down toward the cutters. (See Fig. 1.) To assist the bark M M in its downward movement the spurred rollers N N are used, which are hung at the ends of the swinging levers T, which are pressed downward by means of springs or other suitable means. (See dotted lines at S S, Fig. 1.) The spurred feed-rollers N N may be driven by belts T' T' from the pulley P, or by any convenient means.

W represents one of the fans attached to the inside of the knife-wheel, which serves to create strong drafts and draw all dust through the knife throats or apertures and assist in discharging the shavings from the knife-wheel as fast as they are cut off.

It is obvious that one half of the knife-wheel may be used by slightly modifying the feed-tables.

I claim—

1. In a cutting or reducing mill, the combination of a knife-wheel the working-surface of which is ovate and adapted to receive straight-edged knives, with straight-edged knives, substantially as and for the purpose set forth.

2. In a cutting or reducing mill, a knife-wheel the working-surface of which is ovate, in combination with flat, flexible, straight-edged knives, substantially as and for the purpose set forth.

3. In a cutting or reducing mill, the combination of a knife-wheel the working-surface of which is ovate, with cutting-knives, substantially as and for the purpose set forth.

4. In a cutting or reducing mill, the combination of a knife-wheel the working-surface of which is ovate, and having cutting-knives, with feed-tables, substantially as and for the purpose set forth.

5. In a cutting or reducing mill, the combination of a knife-wheel the working-surface of which is ovate, and having cutting-knives, with fans, substantially as and for the purpose set forth.

GEORGE T. McLAUTHLIN.

Witnesses:
 FRANK G. PARKER,
 M. W. E. BRUNKHORST.